United States Patent [19]

Newman

[11] Patent Number: 4,887,984
[45] Date of Patent: Dec. 19, 1989

[54] MARINE TRANSMISSION WITH FLUID COUPLER

[75] Inventor: Neil A. Newman, Omro, Wis.

[73] Assignee: Brunswick Corporation, Skokie, Ill.

[21] Appl. No.: 255,618

[22] Filed: Oct. 11, 1988

Related U.S. Application Data

[63] Continuation-in-part of Ser. No. 96,739, Sep. 15, 1987, abandoned.

[51] Int. Cl.$^4$ .............................................. B60K 41/02
[52] U.S. Cl. ......................................... 440/86; 440/5; 417/385; 74/731
[58] Field of Search ...................... 440/83, 84, 86, 49, 440/88, 89, 1, 5, 74, 75; 180/165, 305, 307; 192/0.076, 0.096, 3.31, 3.34, 4 R, 4 B; 114/269; 417/375, 379, 380, 383, 385, 390; 60/341, 435, 439, 440; 74/645, 730, 731, 732

[56] References Cited

U.S. PATENT DOCUMENTS

| | | | |
|---|---|---|---|
| 2,321,098 | 6/1943 | Morse | 440/74 |
| 2,749,776 | 6/1956 | Fischer et al. | 440/74 |
| 3,407,600 | 10/1968 | Meyer | 192/3.31 |
| 3,887,048 | 6/1975 | Jahnel et al. | 440/86 |
| 4,316,722 | 2/1982 | Aschauer | 440/5 |
| 4,395,240 | 7/1983 | Blanchard | 440/86 |
| 4,451,238 | 5/1984 | Arnold | 440/74 |
| 4,464,127 | 8/1984 | Boudreaux | 440/74 |
| 4,558,769 | 12/1985 | Neisen | 192/3.31 |

Primary Examiner—Joseph F. Peters, Jr.
Assistant Examiner—Flifford T. Bartz
Attorney, Agent, or Firm—Andrus, Sceales, Starke & Sawall

[57] ABSTRACT

A fluid coupling is provided in a marine drive between the engine and the propulsion unit. The fluid coupling includes a fluid pump connected to the flywheel of the engine, and a turbine connected to an output shaft leading to the propulsiion unit. A series of vanes are provided between the fluid pump and the turbine, to direct the flow of fluid from the fluid pump to the turbine. The vanes between the pump and the turbine are movable to control the direction of impingement of fluid on the turbine, to regulate the speed and/or direction of rotation of the turbine relative to the speed and direction of rotation of the fluid pump.

12 Claims, 2 Drawing Sheets

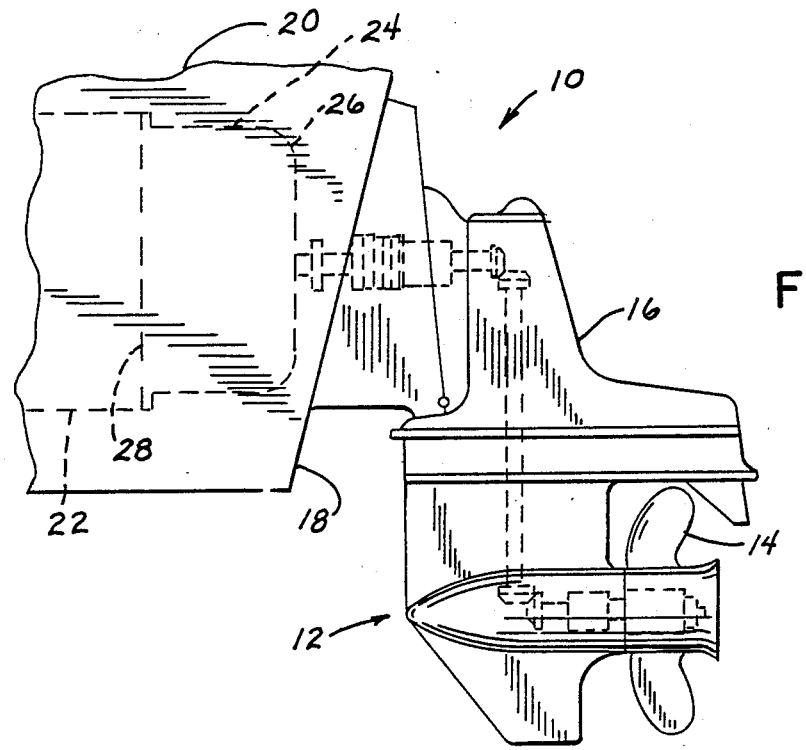
FIG. 1
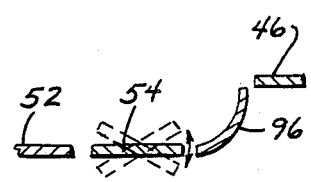
FIG. 4
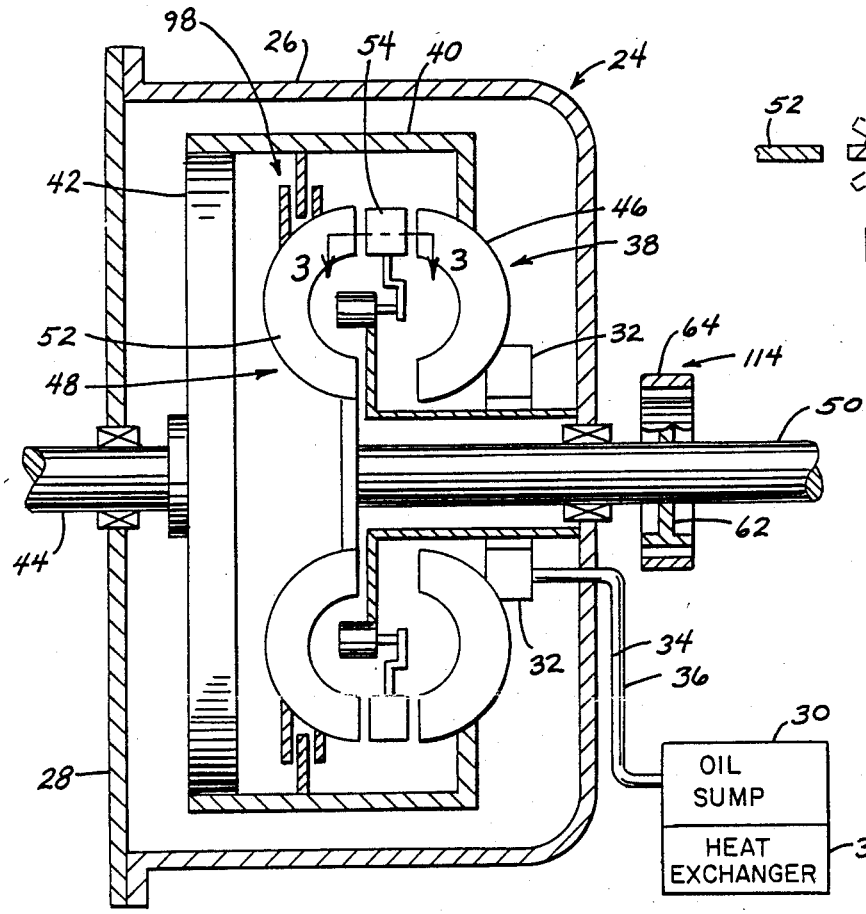
FIG. 3
FIG. 2

MARINE TRANSMISSION WITH FLUID COUPLER

CROSS REFERENCE TO RELATED APPLICATION

This application is a continuation-in-part of Ser. No. 07/096,739 filed Sept. 15, 1987, now abandoned.

BACKGROUND AND SUMMARY

This invention relates to a transmission system for a marine drive.

In a conventional marine drive, including an engine and a propulsion unit, the engine is directly and mechanically connected to the propeller through a gear box. As a result, the speed of the propeller is always directly proportional to the speed of the engine in a ratio established by the gears of the gear box.

The characteristics of the marine drive, including the gear ratio in the gear box and the size and pitch of the propeller, are usually selected to provide optimum performance to the boat at or near its wide open throttle condition. This is because the boat is generally rated at or near wide open throttle conditions. However, with such a selection of the marine drive characteristics, performance of the boat under conditions other than at or near wide open throttle generally suffers.

One particular operating condition adversely affected by the usual selection of marine drive characteristics is low-speed boat operation, such as for trolling or docking. Due to the aforementioned direct connection of the propeller to the engine, the minimum operational speed of the boat is limited by the minimum engine speed, generally attained at idling conditions. Such boat speed, in turn, is generally determined by the propeller selected. Because the propeller is generally selected to provide optimum performance at other than low speeds, this results in an undesirably high boat speed at engine idle conditions, causing difficulty in docking or other low boat speed maneuvering. Furthermore, under some conditions such low engine idle speeds are unreliable, and stalling of the engine may result.

Therefore, the object of the present invention is to provide a marine drive which provides low boat speeds and which allows reliable engine operation at such low boat speeds, and which retains optimum performance of the boat at operating conditions other than low speed, such as at higher engine speeds and at wide open throttle. Another object of the invention is to provide a marine drive which facilitates propulsion direction changes, such as between forward and reverse.

To this end, the marine drive of the present invention utilizes a fluid coupling device between the marine drive engine and gear box. The fluid coupling includes a rotatable fluid pump connected to the engine and rotatable in response to rotation of the engine crankshaft. A rotatable turbine is driven by the fluid pump, and is connected to an output shaft coupled to the propulsion unit. The fluid coupling further includes fluid direction controlling means between the fluid pump and the turbine, for controlling the direction of impingement of fluid on the turbine. Such control of the fluid impingement direction governs the speed and direction of rotation of the turbine in response to rotation of the pump. The control of speed of rotation of the turbine allows control of the speed of rotation of the output shaft, to control boat speed. The control of direction of rotation of the turbine dictates of rotation of the output shaft, to govern the direction of propulsion of the boat. In one embodiment, the fluid direction controlling means comprises a stationary ring of vanes disposed between the fluid pump and the turbine. The vanes can either be permanently fixed or clutched to ground. The vanes are movable in response to direct or indirect actuation by the operator of the boat, to control the direction of the fluid from the fluid pump. The vanes act to absorb a certain amount of power from the fluid pump, and transmit only a portion of the available power to the turbine through the fluid medium. In this manner, boat speed, which is governed by rotation of the output shaft, may be substantially lower than engine speed. The vanes also can act to govern direction of rotation of the turbine to control the direction of boat propulsion.

A portion of the power available from the fluid pump 11 will be transferred to the fluid medium in the form of heat. Thus, a heat exchanger is provided adjacent a fluid sump through which the fluid circulates. This cools the fluid prior to its circulation back into the fluid coupling, to dissipate the absorbed energy.

The fluid coupling of the invention incorporates built-in inefficiencies which are effective to provide low boat speeds at engine speeds well above idle, dependinhg on the direction of the vanes. However, under certain operating conditions, such as when high boat speed is desired, it is desirable to eliminate such built-in inefficiencies. To this end, a clutch is provided between the fluid pump and the turbine, to eliminate the effect of the fluid coupling. In this manner, the fluid pump and the turbine can be directly mechanically coupled to bypass the fluid coupling in response to certain operating variables. For example, the pump and the turbine can be clutched together in response to a certain predetermined engine speed. When the pump and the turbine are clutched together, it is desirable to drain the fluid from the housing of the fluid coupling to a fluid sump, so as to reduce turbulence of the fluid and waste of power. Alternatively, if the vanes are clutched to ground, such clutching can be released so as to allow the vanes to rotate with the pump and turbine. In this instance, draining of the fluid coupling housing is unnecessary.

A brake is provided on the output shaft of the fluid coupling. The brake acts responsively to certain predetermined low speeds of rotation of the output shaft. Thus, when the output shaft rotates at a certain predetermined low speed, the brake physically engages the output shaft to prevent its rotation. This eliminates any low speed rotation of the turbine which may be caused by a change in fluid direction from the vanes due to varying engine and pump speeds when a neutral condition is desired.

BRIEF DESCRIPTION OF THE DRAWINGS

The drawings illustrate the best mode presently contemplated of carrying out the invention.

In the drawings:

FIG. 1 is a partial elevation view showing the improved marine drive of the present invention;

FIG. 2 is a schematic diagram of a fluid coupling device used in the improved marine drive of the present invention;

FIG. 3 is a partial sectional view taken generally along line 3—3 of FIG. 2;

FIG. 4 is a view similar to FIG. 3, showing an alternate embodiment of the invention;

DETAILED DESCRIPTION OF THE PREFERRED EMBODIMENT

Figure 5:
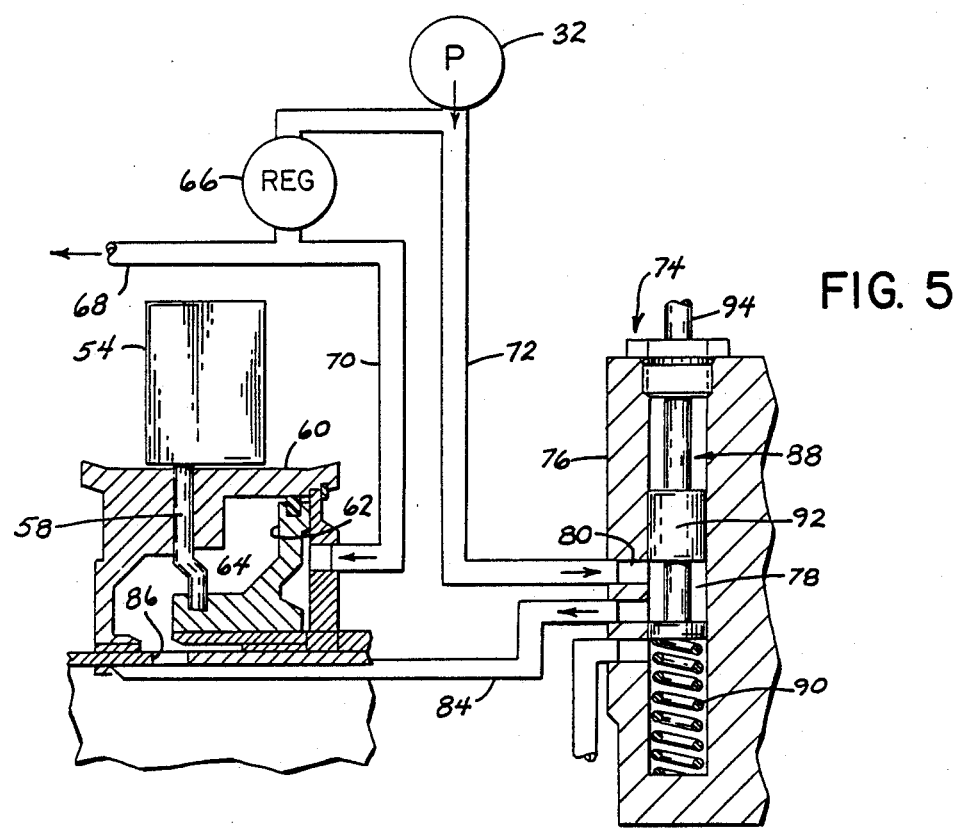
FIG. 5 is a view detailing a mechanism for controlling the orientation of the variable position vanes.

As shown in FIG. 1, a marine drive 10, shown as an inboard-outboard stern drive, includes a propulsion unit 12 having a propeller 14 and a gear box 16, as is well known. These elements are mounted on the exterior of transom 18 of a boat 20. An engine 22 of conventional construction is mounted inside boat 20.

In accordance with the present invention, a fluid coupling 24 is interposed between engine 22 and propulsion unit 16. With reference to FIGS. 1 and 2, fluid coupling 24 has a housing 26 bolted or otherwise connected to the crankcase 28 of engine 22. A hydraulic fluid is provided in the interior of housing 26 of fluid coupling 24. Hydraulic fluid is supplied to the interior of housing 26 from an oil sump 30 by means of an oil pump 32 and connecting lines 34, 36, as is well known. A heat exchanger 37 is operatively connected to sump 30.

A fluid pump or driving member 38 is coupled via a connecting member 40 to the flywheel 42 of engine 22, which in turn is coupled to the crankshaft 44 of engine 22. Crankshaft 44 forms the input shaft to fluid coupling 24. Fluid pump 38 includes a series of impeller blades 46 which circulate hydraulic fluid within housing 26.

A turbine, or driven member, 48 is connected to an output shaft 50 of fluid coupling 24 which extends to gear box 16. Turbine 48 includes a series of blades 52, which are driven by the action of fluid circulated in housing 26 by pump 38 and its associated blades 46. Output shaft 50 is driven in response to such rotation of turbine 48.

A ring of fluid deflecting vanes 54 is provided between impeller blades 46 of pump 38 and blades 52 of turbine 48. Vanes 54 act to alter the direction of the hydraulic fluid as it comes off of blades 46 of pump 38, prior to such fluid impinging on blades 52 of turbine 48.

A vane direction actuating mechanism, shown schematically at 56 in FIG. 2, is provided to control the orientation of vanes 54. As shown in FIG. 3, vanes 54 are movable, so as to control the direction of impingement of fluid on blades 52 of turbine 48. The mechanism for controlling the orientation of vanes 54 is shown in detail in FIG. 5, and will later be explained. Vanes 54 are selectively movable between a first position, in which fluid circulated by pump 38 is transmitted to turbine blades 52 with very little change of direction, and a second position in which the fluid direction is altered greatly. The first position provides transfer of most of the power from pump 38 to turbine 48, while the second position of vanes 54 allows little to none of the power generated by pump 38 to be transferred to turbine 48. Vanes 54 are movable throughout the range of positions between the first position and the second position. Vanes 54 also govern the direction of rotation of turbine 48.

As noted above, FIG. 5 illustrates vane direction actuating mechanism 56 in detail. With reference to FIG. 5, each vane 54 is connected to a crank 58, with cranks 58 being rotatably mounted in a carrier member 60. Each crank 58 has its inner end mounted to a piston 62 slidably disposed within a cavity 64 formed in carrier 60. As shown, oil pump 32, shown schematically in FIG. 5, supplies oil pressure within fluid coupling housing 26 through a pressure regulator, shown at 66. From pressure regulator 66, hydraulic fluid under pressure is supplied to the interior of housing 26 through a line 68, and to the converter side of piston 62 through a line 70. Simultaneously, fluid from pump 32 is supplied through a line 72 to a control valve mechanism, shown at 74.

As shown, control valve 74 is mounted within a valve housing 76 which includes an internal cavity 78 in communication with line 72 through an inlet port 80. An outlet port 82 provides communication between cavity 78 and an outlet line 84, which communicates through an opening 86 with carrier cavity 64.

Control valve 74 includes a spool member 88 provided within valve housing cavity 78. Spool 88 is biased upwardly by a spring 90, and includes a control block member 92. A manually operable control rod 94 is axially movable in response to operator control to control the position of spool 88, and thereby control block 92. The position of the lowermost surface of control block 92 determines the amount of control pressure applied to the leftward surface of piston 62, and thereby the pressure differential existent between converter pressure applied to the rightward side of piston 62 and control pressure applied to the leftward side of piston 62. In this manner, the axial position of piston 62 within cavity 64 is controlled, resulting in control of the position of vanes 54.

As shown in FIG. 4, an additional ring of curved vanes 96 may be provided between pump 38 and vanes 54. Curved vanes 96 alter the direction of fluid flow coming off of pump 38 to axial, after which variable position vanes 54 redirect the axially directed fluid onto the turbine blades.

A clutch, schematically shown at 98, is provided between connecting member 40 and turbine 48. Clutch 98 is capable of providing a direct mechanical connection, a lock-up condition between pump 38 and turbine 48. This direct connection of pump 38 to turbine 48 eliminates the fluid coupling between input shaft 44 and output shaft 50, the function of which will be explained.

Figure 6:
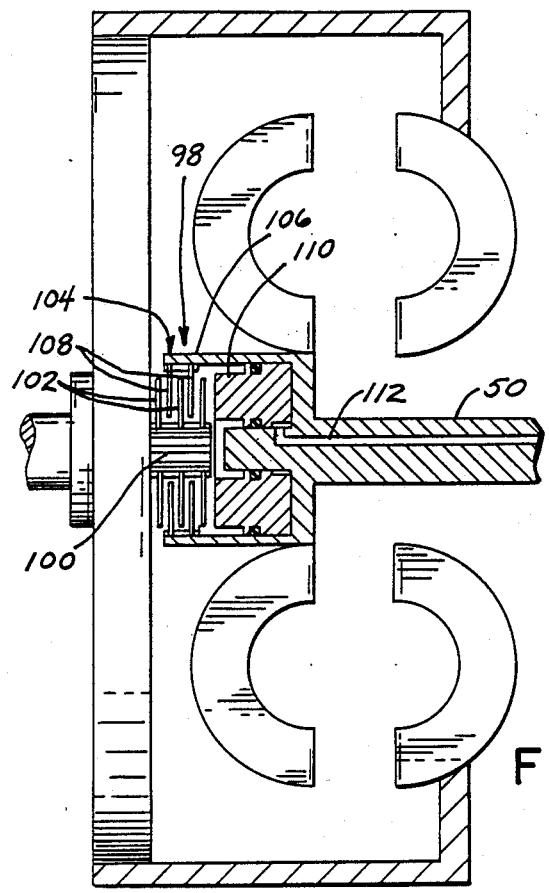
FIG. 6 is an illustration of a lock-up clutch for directly coupling the flywheel to the output shaft.

One embodiment of clutch 98 is illustrated in FIG. 6. As shown, a projecting stub 100 is provided on the inside face of flywheel 42. A series of clutch plates 102 are splined to stub 100. A clutch drum 104 is fixed to the leftward end of output shaft 50, and includes a drum outer surface 106. A series of clutch plates 108 are connected to the inner surface of drum outer plate, meshing with clutch plates 102. An axially movable piston 110 is provided between the leftward end of output shaft 50 and the inner surface of drum outer plate 106, and is movable back and forth in response to fluid pressure provided at its rightward surface through a fluid path 112 formed in output shaft 50. Pressure is selectively provided in path 112 by means of a solenoid valve operated responsive to operator command, as is known. Actuation of the solenoid valve provides pressure within path 112, which causes leftward movement of piston 110 resulting in leftward movement of clutch plates 102 and engagement of such clutch plates with clutch plates 108 for coupling flywheel 42 directly to output shaft 50.

A brake mechanism shown generally at 114 in FIG. 2, is provided on output shaft 50. Brake mechanism 114 includes a drum member 116 mounted on output shaft 50 and a band 118 disposed adjacent the outer surface of drum 116. Through known operating principles, band 118 is selectively engageable with drum 116 so as to selectively prevent rotation of output shaft 50, for reasons to be explained.

When it is desired to operate the boat at low speeds, the fluid coupling 24 of the invention comes into play by allowing the boat operator to maintain engine speed at a level well above idle while simultaneously providing a low boat speed. This is accomplished by the action of vanes 54, which, in such a situation, are positioned so as to obstruct the flow of fluid between pump 38 and turbine 48, thus transmitting little or no power from pump 38 to turbine 48. Vanes 54 are moved to the appropriate position by vane direction actuating mechanism 56, which is operable either directly or indirectly by the boat operator. That is, a separate control valve 74 is provided for governing the position of vanes 54. Control valve 74 is either independently operable by the boat operator, or interdependent with the boat throttle. In either instance, the manner of constructing valve 74 and its actuating mechanism would be evident to one of ordinary skill in the art.

A portion of the power generated by pump 38 not transmitted to turbine 48 is transferred in the form of heat to the hydraulic fluid disposed within housing 26. Such generated heat is removed from the hydraulic fluid when the fluid is circulated through sump 30, where heat exchanger 37 removes heat therefrom. Thereafter, the hydraulic fluid is recirculated into housing 26 by pump 32.

By controlling the direction of vanes 54, the direction of turbine 48 is controlled. That is, when vanes 54 are moved to a certain position, the direction of impingement of fluid on turbine 48 causes turbine 48 to rotate a certain direction, for example clockwise. Movement of vanes 54 to a second position causes turbine 48 to rotate the other direction, i.e. counterclockwise. Such control of the direction of rotation of turbine 48 controls the direction of rotation of output shaft 50, and therefore the direction of propulsion of the boat.

Fluid coupling 24 thus allows the operator to run engine 22 at speeds well above the idle speed of the engine, while nonetheless providing a relatively low amount of power to be transmitted from engine 22 to output shaft 50 of propulsion unit 12. This provides greater control of the boat when performing low speed maneuvers such as docking or trolling, while allowing engine 22 to run well above conditions which may otherwise cause it to stall out, such as when engine 22 is cold or improperly tuned.

At very low speeds of rotation of output shaft 50, brake mechanism 114 operates to completely prevent rotation of output shaft 50. This is because, due to the continual rotation of pump 38, it may sometimes be impossible to completely prevent the transmission of power from pump 38 to turbine 48 even at low speeds of rotation of pump 38. This causes difficulty in effecting a completely neutral condition for the marine drive, wherein the output shaft is idle. Brake 114 may be operable in response to manual actuation by the operator. Alternatively, brake 60 may be interlinked with the boat throttle to be selectively engaged when the throttle is positioned in the neutral position, or may be associated with output shaft 50 so as to be actuable in response to low rotational speeds thereof. In any event, it is believed that such actuating mechanisms are within the knowledge of one ordinarily skilled in the art.

Provision of brake 114 allows a wider range for neutral, and resists the tendency of turbine 48 to turn in response to rotation of pump 38 to prevent rotation of output shaft 50 at certain preselected speeds of rotation. When the speed of rotation of output shaft 50 exceeds a certain predetermined level, brake 114 is released to thereafter allow its rotation. Alternatively, a release mechanism may be provided in connection with the throttle whereby brake 114 is released upon actuation of the throttle or brake 114 may be manually released by the operator.

After low speed operation and maneuvering of the boat is completed, the operator may then wish to accelerate the boat to achieve higher boat speeds. This can be accomplished with fluid coupling 24 of the present invention by altering the orientation of vanes 54 so that power generated by pump 38 is most efficiently transferred to turbine 48.

As acceleration of the boat continues, at a certain point it becomes inefficient to provide a fluid coupling between input shaft 44 and output shaft 50. This predetermined point may be determined by engine speed, engine manifold vacuum, engine ignition advance, oil pressure, or any other suitable operating condition. When this predetermined point is reached, clutch 58 between fluid pump 38 and turbine 48 is engaged to mechanically directly connect pump 38 to turbine 48. Such action bypasses the effect of fluid transmission 24 between input shaft 44 and output shaft 50. Input shaft 44 and output shaft 50 then rotate in a 1:1 relation. Reference is made to Neisen U.S. Pat. No. 4,558,769 for a discussion of satisfactory mechanisms for triggering direct coupling of flywheel 42 to output shaft 50 through lock-up clutch 58.

When input shaft 44 and output shaft 50 are directly mechanically connected in the above-described manner, it is desirable to drain the hydraulic fluid from the interior of housing 26. Otherwise, even though pump 38 and turbine 48 are directly connected, fluid will nonetheless be pumped by pump 38 and act on vanes 54. Such action results in hydraulic fluid turbulence and a significant amount of drag on pump 38 and turbine 48 as they rotate together, thus causing highly inefficient operation of fluid coupling 24. Thus, during direct mechanical connection of pump 38 to turbine 48, the fluid contained within housing 26 is completely drained or pumped to sump 30. Alternatively, as noted, it is contemplated that the ring of vanes 54 may be clutched to housing 26 or other suitable ground. In this manner, in response to the clutching of pump 38 to turbine 48, the clutch of vanes 54 to housing 26 is disengaged to allow vanes 54 to rotate freely along with pump 38 and turbine 48, thus constituting an additional non-working flywheel mass.

When the boat decelerates and a threshold condition is reached, the direct mechanical clutching of turbine 48 to pump 38 via clutch 58 is released. This reengages fluid coupling 24 through pump 38 and turbine 48 to control low-speed operation of the boat.

Figure 7:
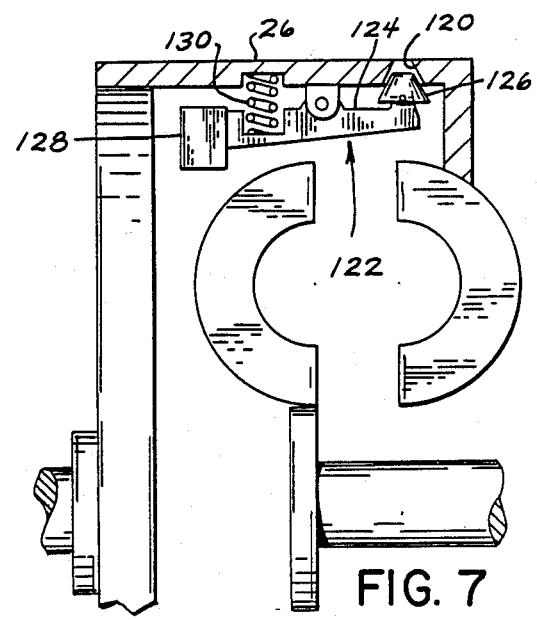
FIG. 7 is an illustration of a mechanism for draining fluid from the fluid coupling during the lock-up condition.

Reference is made to FIG. 7, which illustrates a means for draining hydraulic fluid from fluid coupling 24. As shown in FIG. 7, housing 26 is provided with a drain opening 120. A plug mechanism, shown generally at 122, is provided for selectively opening drain opening 120 in response to a predetermined engine speed, for selectively draining fluid therefrom. Plug mechanism 122 includes a pivotably mounted arm 124 having a plug 126 mounted to one end thereof. As shown, plug 126 is constructed so as to conform to the sides of opening 120. A weight 128 is provided at the opposite end of arm 124, and a spring 130 baises mechanism 122 toward ite closed position, in which plug 126 closes opening 120. In response to a predetermined engine speed, the force exerted by spring 130 is overcome by the force of weight 128 on the end of arm 124, thereby moving plug 126 out of engagement with opening 120 and allowing fluid to drain therethrough. When engine speed decreases below the predetermined level, spring 130 overcomes the force exerted by weight 128 to once again close opening 120 by biasing it to its closed position. Fluid is then again allowed to accumulate within the interior of housing 26.

While the invention has been described with reference to a stern drive system, it is recognized that the invention is equally applicable to an inboard marine drive.

It is recognized that various alternatives and modifications are contemplated as being within the scope of the following claims particularly pointing out and distinctly claiming the subject matter regarded as the invention.

What is claimed is:

1. In a marine drive for a boat, said marine drive including an engine and a propulsion unit, the improvement comprising:
   a fluid coupling interposed in the marine drive between the engine and the propulsion unit, said fluid coupling including a rotatable fluid pump connected to the engine and a rotatable turbine driven by said fluid pump, said turbine being connected to an output means coupled to the propulsion unit for transferring power from said engine to said propulsion unit, said fluid coupling further including fluid direction controlling means comprising a series of vanes located beteen said fluid pump and said turbine, said vanes being movable in response to operator control for controlling the direction of impingement of fluid on said turbine, and thereby the speed and direction of rotation of said turbine.

2. The invention according to claim 1, further comprising brake means for prohibiting movement of said output means when said output means operates at a preselected low level to effect a neutral condition for said marine drive.

3. The invention according to claim 2, wherein said output means comprises a rotatable shaft connected to said turbine and coupled to said propulsion unit, and wherein said brake means prohibits rotation of said output shaft when said output shaft rotates a preselected low speed of rotation.

4. The invention according to claim 3, wherein said brake means physically engages said output shaft to prohibit its rotation.

5. The invention according to claim 1, wherein said fluid of said fluid coupling is heated in response to the action of said fluid coupling, and further comprising cooling means associated with said fluid coupling for cooling said heated fluid.

6. The invention according to claim 5, wherein said cooling means comprises a heat exchanger for cooling said fluid.

7. The invention according to claim 1, further comprising locking means for interlocking said engine with said output means in response to a preselected operating condition to eliminate the fluid coupling between said engine and said propulsion unit.

8. The invention according to claim 7, wherein said locking means for interlocking said engine with said output means comprises clutch means for interlocking said pump with said turbine.

9. The invention according to claim 8, wherein, when said pump and said turbine are interlocked, fluid contained within said fluid coupling is drained therefrom by a drain means associated therewith to allow said turbine and said pump to rotate together without a fluid coupling therebetween.

10. The invention according to claim 1, wherein said fluid coupling includes fluid pump means for regulating the supply and drainage to fluid to and from said fluid coupling.

11. The invention according to claim 1, wherein said fluid pump is operably connected to the flywheel of said marine drive engine and is rotatable in response to rotation of the crankcase of said engine.

12. A marine propulsion system, comprising:
    an engine having a rotatable output shaft;
    a propulsion unit including a rotatably mounted propeller; and
    a fluid coupling interposed beteen the engine and the propulsion unit, said fluid coupling including:
      a rotatable fluid pump interconnected with and rotatable in response to rotation of said engine output shaft;
      a rotatable turbine adapted to be driven by said fluid pump;
      output means interconnected with said turbine and coupled to said propulsion unit for providing rotation of said propeller in response to rotation of said turbine; and
      fluid direction controlling means comprising a series of vanes located between said fluid pump and said turbine, said vanes being movable in response to operator control for controlling the direction of impingement of fluid on said turbine, and thereby the speed and direction of rotation of said turbine.

* * * * *

UNITED STATES PATENT AND TRADEMARK OFFICE
CERTIFICATE OF CORRECTION

PATENT NO. : 4,887,984
DATED : December 19, 1989
INVENTOR(S) : NEIL A. NEWMAN

It is certified that error appears in the above-identified patent and that said Letters Patent is hereby corrected as shown below:

Claim 3, Col. 7, Line 56, after "rotates" insert --- at ---;

Claim 10, Col. 8, Line 29, after "drainage" delete "to" and substitute therefor --- of ---;

Claim 11, Col. 8, Line 34, delete "crankcase" and substitute therefor --- crankshaft ---

Signed and Sealed this

Eighteenth Day of June, 1991

Attest:

HARRY F. MANBECK, JR.

*Attesting Officer*  *Commissioner of Patents and Trademarks*